Figure 1:
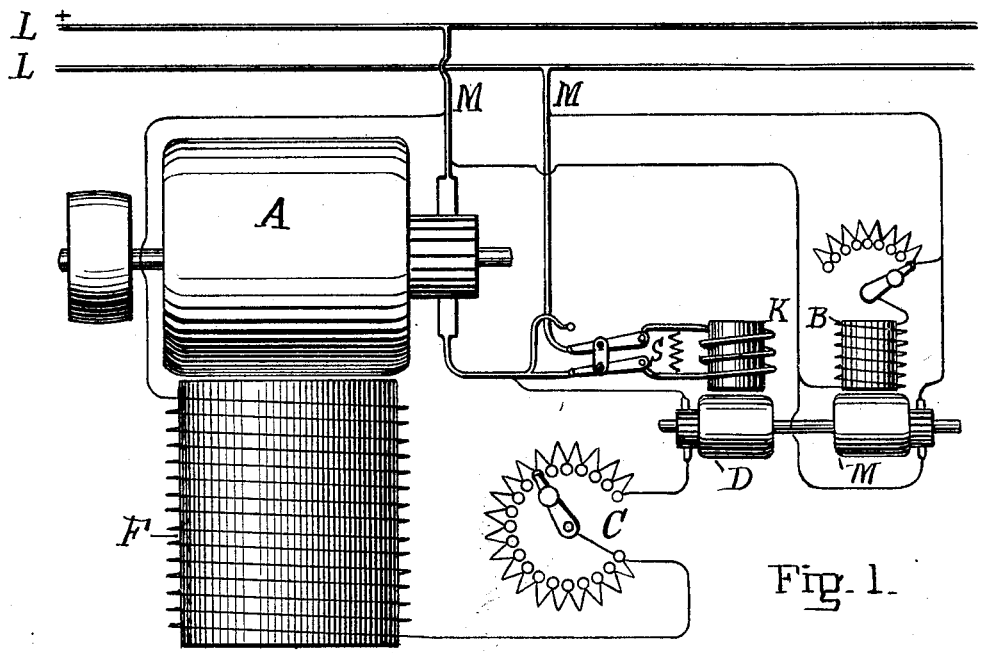

(No Model.)

G. S. DUNN.
INDIRECT REGULATION OF DYNAMO ELECTRIC MACHINERY.

No. 591,343. Patented Oct. 5, 1897.

Witnesses:
Samuel W. Balch
Hy. H. Whitman

Inventor,
Gano. S. Dunn,
by Thomas Ewing, Jr.,
Attorney.

UNITED STATES PATENT OFFICE.

GANO S. DUNN, OF EAST ORANGE, NEW JERSEY, ASSIGNOR TO THE CROCKER-WHEELER ELECTRIC COMPANY, OF NEW JERSEY.

INDIRECT REGULATION OF DYNAMO-ELECTRIC MACHINERY.

SPECIFICATION forming part of Letters Patent No. 591,343, dated October 5, 1897.

Application filed July 8, 1896. Serial No. 598,400. (No model.)

*To all whom it may concern:*

Be it known that I, GANO S. DUNN, a citizen of the United States of America, residing at East Orange, county of Essex, State of New Jersey, have invented certain new and useful Improvements in Indirect Regulation of Dynamo-Electric Machinery, of which the following is a specification.

I shall call the dynamo-electric machine to be regulated or controlled the "main machine," and the machine by which the regulation or control is effected I shall call the "regulating-machine."

My invention is applicable to the regulation of dynamo-electric machinery, whether the main machine is used as a dynamo or as a motor. If it is to be used as a dynamo, it will be used to supply to the leads connected with its armature a constant-potential current, or in certain cases a current the potential of which is maintained more constant than it would be if the regulating-machine were not used, or, as is often desirable, a current the potential of which rises as the load increases, or by reversal of the above operation it may supply a current the potential of which decreases as the current itself increases. If the main machine is to be used as a motor, it will be connected between the leads of a constant-potential circuit, and, except as hereinafter stated, it will be run at a constant speed with varying load.

In accordance with my invention I connect the armature of a shunt-wound or separately-excited main machine to the leads. I place all or a part of the field-coils of a regulating-machine in series with the armature of the main machine and place the armature of the regulating-machine in series with all or part of the field-coils of the main machine. The regulating-machine is geared to other apparatus, so that it shall run at a constant speed. I may employ a separately-excited main machine; but ordinarily I would employ a shunt-wound machine. In this case I place the armature of the regulating-machine in the shunt with the field-coils of the main machine, the two being connected across or in multiple with the line and in series with each other. In this arrangement it will be seen that the field-coil of the regulating-machine which is in series with the armature of the main machine is supplied by and its field strength is dependent upon the current in the armature of the main machine and is independent of the current in its own armature, except that there will be some reaction by reason of the current in its own armature, which, however, I do not rely upon for effecting regulation. The field strength of the main machine is dependent upon the algebraic sum of the voltages of the line and the regulating-machine. The regulating-machine will either be run as a motor by the current in the field-circuit and help drive the machinery to which it is geared, developing a counter electromotive force which cuts down the effective electromotive force of this circuit, or it will be run by the machinery to which it is geared and will generate an electromotive force that will be added to the electromotive force in the field-circuit, and thereby increase the effective electromotive force therein. It may be changed from one of these forms to the other by merely changing the direction of the field of the regulating-motor without changing the direction of rotation of its armature. The regulating-machine may also be so arranged that without change in the connections it shall under some conditions be run as a motor by the current in the field-circuit and under other conditions be run as a generator by the machinery to which it is geared. These three methods are called, respectively, the "retard," the "boost," and the "retard-and-boost" methods. In each of the three methods the speed of the armature of the regulating-machine should be kept constant and the field of the regulating-machine be varied with the current in the main machine, and the field strength of the machine to be regulated, which is the main machine, is dependent upon the algebraic sum of the voltage of the two machines.

Figure 2:
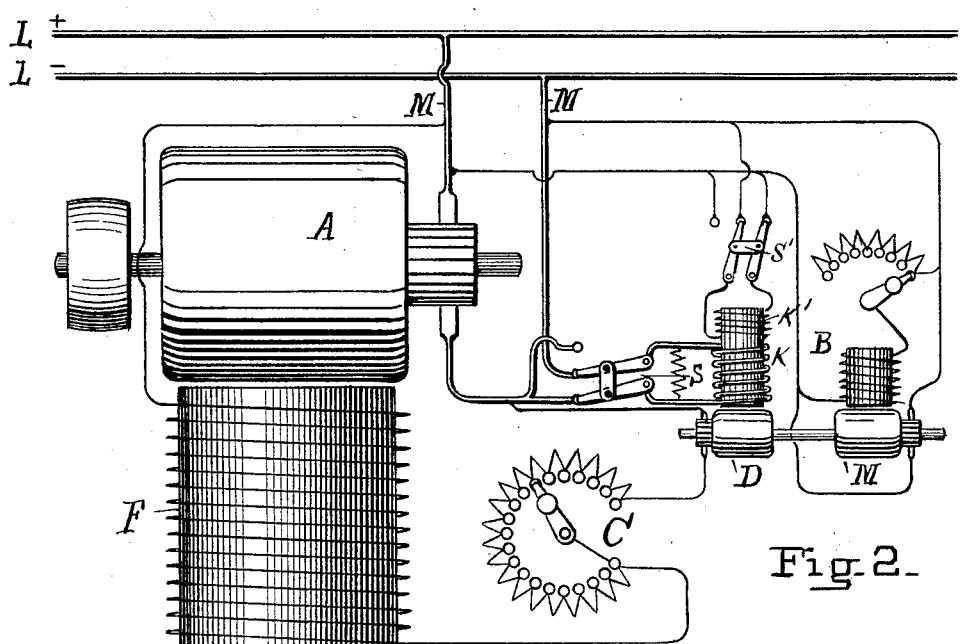

In the accompanying drawings, which form a part of this specification, Figure 1 represents one form of the apparatus for practicing one retard or boost method. Fig. 2 is a modification of Fig. 1 for practicing retard, boost, and retard-and-boost methods.

Fig. 1 illustrates the form in which the regulating-machine acts as an increasing boost or as an increasing retard, the effect in both cases varying directly and proportionately with the current in the main machine. There is shown a shunt-wound machine, which is the main machine, with its armature A connected with the mains L L. In series with armature A is connected the field-coil K of a dynamotor, the part D K of which is the regulating-machine. The armature D is in series with the field F of the main machine, and a rheostat C is preferably, but not necessarily, connected in circuit with them. The other half M B of the dynamotor is shown as a shunt-wound machine connected across the mains, the field B having a rheostat in series with it. Whether the part D K of the dynamotor will run as a motor or a dynamo depends on the direction of the current in the field K, as is well understood. The field-coil is connected in the line with a reversing-switch. If the machine A is running as a dynamo and the connections are such that the armature D is running as a dynamo, it will boost the electromotive force in the field-circuit. The extent of the boost will vary in the same direction and proportionately with the strength of the field K, which in turn will vary in like manner with the current in the armature of the main machine. With this arrangement of the reversing-switch if the load—i. e., the current generated—changes the main machine may be made to generate a constant potential or a potential which increases with increase of load. With the same arrangement of the switch if the main machine is used as a motor on a constant-potential circuit the armature D will run as a motor and diminish the effective electromotive force in the field-coils of the main machine, its counter electromotive force varying in the same direction and proportionately with the strength of its field, and hence with the strength of the current in the armature of the main machine. The field of the main machine will weaken with increase of load and strengthen with decrease of load. If the connection of the field K be reversed with respect to the circuit M A M by changing the reversing-switch, then armature D will run as a motor when armature A is running as a dynamo and will weaken the field K with increase of current and strengthen it with decrease of current. If armature A is running at variable speed, variations in the potential of the current will be diminished. If the armature A is running at a constant speed, variation in the strength of the current will be diminished, or armature D will run as a dynamo when the armature A runs as a motor, and the field F is strengthened with increase of load and weakened with decrease of load.

Fig. 2 illustrates a form in which the regulating-machine will operate as a retard or as a boost. The effects are described in both cases as varying inversely and not, as with Fig. 1, directly with the current in the main machine. The arrangement may be made to operate in the same manner as that of Fig. 1; but it will not be so described. It may also operate as a retard and boost, in which case it may pass gradually from maximum retard to maximum boost or from maximum boost to maximum retard with increase of current in either direction in the armature of the main machine, according to the direction of the field of the regulating-machine. The field-coils are connected to line through reversing-switches S and S'. If used as a retard and boost, it need not be so large as where it is to be used always as a retard or always as a boost. For a one-hundred-kilowatt main machine a regulating-machine of about one-half horse-power capacity will do the work when acting as a retard and boost. There is on the field of the regulating-machine, in addition to the coils which are connected to the line in series with the armature of the main machine, a constant excitation, which may be in the form of coils supplied from a storage battery or the like; but I have shown these coils as supplied from leads taken from the main, and where the system is a constant-potential system the excitation will of course be practically constant. Where in the claims I specify that one of the coils of the regulating-machine has an excitation that is constant, I mean to indicate that it is supplied from the same independent source or from the main machine in the manner stated. The two field-coils always oppose each other and may be so wound as to be balanced while there is an assumed mean current in the armature of the main machine. The regulating-machine will then act as a retard and boost, either increasing or diminishing the effective electromotive force in the field-circuit of the main machine as the current in the main machine increases. Whether it increases or diminishes, this effective electromotive force depends upon the relative polarities of the fields of the main machine and the regulating-machine. The regulating-machine may start as a motor when the current in the armature of the main machine is low and act as a diminishing-retard as this current rises toward the mean strength and as an increasing-boost as this current increases beyond the mean strength; or, vice versa, the regulating-machine may start as a generator when the current in the armature of the main machine is low and become a motor when this current rises beyond the mean strength. The system is applicable to the regulation of both generators and motors in the manner already described with respect to the arrangement of Fig. 1. The connections of the field-coils of the regulating-machine may be such that the effect of the regulating-machine will be either to increase or to diminish the field of the main machine when it is acting as a dynamo, and the current in the armature of the main machine either increases, or, conversely, the regulating-machine may operate to diminish or increase the field of the main machine when it is acting as a motor and the current in the armature of the main machine increases. The effects of these various changes of the field of the main machine are the same as stated in analogous cases in discussing Fig. 1.

An advantage of the system herein described when the main machine is running in multiple with other machines or with storage batteries is that it can never be reversed by a momentary back current, because the demagnetizing effect of the back current is checked by the saturation of the field of the regulating-machine. This may be explained as follows: A series-wound dynamo cannot be used in multiple with other similar generators or in multiple with constant-potential shunt-wound generators or to charge storage batteries. This is because its voltage varies with its load and a slight decrement in the current delivered, due to accidental reduction in speed or some other minor cause, would produce a decrease of voltage, which would cause a further decrease of delivered current, resulting in a still further decrease of voltage, and so on, until the electromotive force of the dynamo has entirely vanished and has been reversed and carried to a maximum in the opposite direction. An ordinary compound-wound generator the field-magnets of which are partly series wound has the same characteristics, it being possible to reverse its potential by a momentary reverse current in the series coils. In my system this is impossible, because the demagnetizing action due to a reverse current never acts directly upon the field of the main machine, but only indirectly through the regulating-machine. It is therefore limited by the saturation of the field of the regulating-machine, for if a reverse current is strong enough to saturate the field of the regulating-machine it produces just as great an effect as a reverse current indefinitely stronger can produce.

I may supply the place of the part M B of the dynamotor by any other suitable means to keep the speed of the regulating-machine constant.

What I claim, and desire to secure by Letters Patent of the United States, is—

1. The combination of a line, a main machine connected to the line, and a regulating-machine, with a field-coil of the regulating-machine connected to the line in series with the armature of the main machine, and with the armature of the regulating-machine and a field-coil of the main machine, connected across or in multiple with the line and in series with each other, whereby the field strength of the regulating-machine is dependent upon the current in the armature of the main machine, and the field strength of the main machine is dependent upon the algebraic sum of the voltages of the line and the regulating-machine, substantially as described.

2. The combination of a main machine and a regulating-machine, the latter having two opposing field-coils, one the excitation of which is constant, and the other connected in series with the armature of the main machine, the armature of the regulating-machine being connected in series with a field-coil of the main machine, substantially as described.

3. The method of regulating one dynamo-electric machine by another such machine, which consists in making variations in the field strength of the regulating-machine dependent upon the current in the armature of the machine to be regulated, and independent of the current in its own armature and making variations in the field strength of the machine to be regulated dependent upon the algebraic sum of the voltages of the line and the regulating-machine, substantially as described.

Signed by me, in New York city, this 6th day of July, 1896.

GANO S. DUNN.

Witnesses:
CLEVELAND A. DUNN,
ANSON BALDWIN.